United States Patent [19]

Coyle

[11] Patent Number: 4,499,996
[45] Date of Patent: Feb. 19, 1985

[54] PROTECTIVE CARTRIDGE FOR DISC RECORD

[75] Inventor: Peter J. Coyle, Oakland, N.J.

[73] Assignee: RCA Corporation, New York, N.Y.

[21] Appl. No.: 566,886

[22] Filed: Dec. 29, 1983

[51] Int. Cl.³ .................... B65D 85/57; G11B 17/04; G11B 23/02

[52] U.S. Cl. .................... 206/444; 206/303; 206/312; 206/522; 360/133; 369/291; 369/77.2

[58] Field of Search ............. 206/444, 303, 312, 522, 206/45.34, 527, 497; 360/133; 369/291, 77.2

[56] References Cited

U.S. PATENT DOCUMENTS

| | | | |
|---|---|---|---|
| 1,814,785 | 7/1931 | Broadwell | 206/45.34 |
| 2,681,142 | 6/1954 | Cohen | 206/522 |
| 3,668,658 | 6/1972 | Flores et al. | 206/303 |
| 4,063,286 | 12/1977 | Takahara et al. | 358/128 |
| 4,072,229 | 2/1978 | Lloyd et al. | 206/309 |
| 4,097,895 | 6/1978 | Spong | 358/128 |
| 4,168,835 | 9/1979 | Omiya et al. | 274/9 B |
| 4,222,071 | 9/1980 | Bell | 358/128.5 |
| 4,277,810 | 7/1981 | Helmrich | 360/133 |
| 4,365,258 | 12/1982 | Geyer et al. | 346/137 |
| 4,379,507 | 4/1983 | Liabres | 206/444 |
| 4,433,410 | 2/1984 | Siryj et al. | 206/312 |
| 4,462,036 | 7/1984 | Leonard et al. | 346/137 |

Primary Examiner—William T. Dixson, Jr.
Attorney, Agent, or Firm—Joseph S. Tripoli; Robert L. Troike; Christopher Lyle Maginniss

[57] ABSTRACT

A record package includes a disc record housed within an enclosure. The enclosure comprises thin membrane covers held in tension between a metallic outer frame and two inner rings. The inner rings include dust seals which are held against the disc record by the tension of the membranes. When the disc record rotates, the windage it creates lifts the dust seals from the disc record. The use of a clear membrane eliminates the need for a sight window when recording on the playing back from an optical disc record.

19 Claims, 3 Drawing Figures

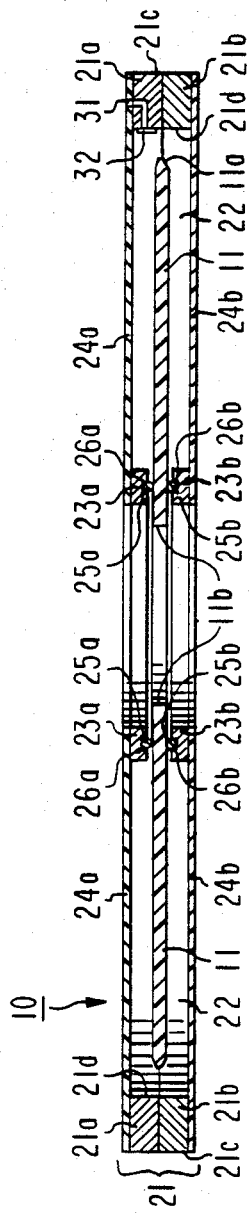
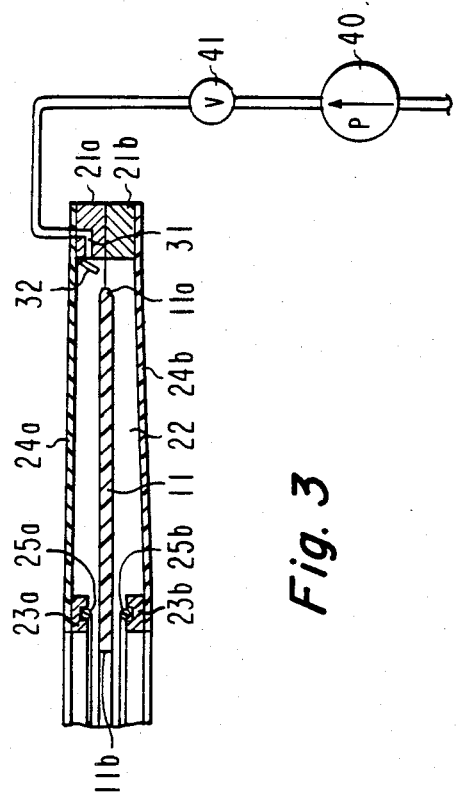
Fig. 2
Fig. 3

PROTECTIVE CARTRIDGE FOR DISC RECORD

The Government has rights in this invention pursuant to a Government Contract.

The present invention relates to disc record systems for use in recording and retrieving information from a disc record and, more particularly, to a cartridge system for protecting the information bearing surfaces of a disc record.

High density optical recording systems which may be used for recording and playing back information are known in the prior art. For example, U.S. Pat. No. 4,097,895 entitled, "MULTI-LAYER OPTICAL RECORD" issued to F. W. Spong on June 27, 1978, describes an optical disc record/playback system wherein data is recorded in the form of pits in an absorptive coating on the surface of an optical disc by focusing a high intensity light beam on the surface. For example, in the Spong system, approximately $10^{11}$ bits of information can be stored on one side of a disc-shaped record medium having a 30 cm diameter.

In optical recording systems involving high density information records, such as the Spong system, dust, finger prints, or the like, or other debris on the information bearing surface of the disc record may adversely affect the operation of the system. Accordingly, it is desirable to provide a record package wherein the disc record is enclosed in a protective cartridge.

A protective cartridge is disclosed in U.S. Pat. No. 4,433,410, "PROTECTIVE CARTRIDGE FOR OPTICAL DISCS," issued Feb. 21, 1984, to Siryj, et al. The Siryj et al. patent addressed the problem of retaining the disc record in a suspended state such that the information bearing surfaces do not contact the cartridge walls, while permitting the disc record to rotate freely during a recording or playback operation.

The Siryj et al. cartridge comprises a disc record and an enclosure having a cavity for housing the disc record. The cartridge includes a plurality of holding means which retain the disc record such that the information bearing surfaces are spaced from the side surfaces of the enclosure. Each of the holding means is slidably positioned in the enclosure and biased to engage the outside rim of the disc record such that the disc record is suspended in the cavity. Each of the holding means additionally has an aperture through it which is slightly offset with respect to a similarly-shaped aperture formed through the cartridge. A reference plate on the player apparatus used for recording and playing back information on the disc record is provided with pins having tapered ends. The pins correspond in position with the apertures in the cartridge and when the cartridge is urged against the reference plate, the pins cause the holding means to slide so as to align the holding means apertures with the cartridge apertures and thus disengage the holding means from the outside rim of the disc record to permit the disc record to rotate within the cavity.

The Siryj et al. enclosure typically employs two sheets of semi-rigid plastic, each approximately one-sixteenth inch thick, sandwiched about the disc record. Light is transmitted to and reflected from the disc record through a window, which is typically a clear plastic or glass plate inserted in an elongated aperture formed in the plastic sheet adjacent the information bearing surface of the disc record.

The design of the above-described enclosure could have some problems when operating over a wide range of temperatures and at high humidity. The most basic of these problems may be the difficulty in maintaining the plastic enclosures flat. They may be subject to slight warpage due to temperature changes between the relatively cool storage area and the reference plate which is subject to heating from the turntable motor, and by virtue of the unequal coefficients of expansion between the plastic enclosure and the metal reference plate. The enclosures undergo thermal expansion and contraction each time they are cycled between storage and operation. Because their plastic must include elastomers to reduce their brittleness, they may also be extremely sensitive to deformation due to high humidity.

In addition, the strength of these enclosures may be reduced by the aperture cut into the side sheets for sight windows. Finally, a relatively complex mechanism, including vacuum actuated suction cups, is required to draw the side walls of the enclosure away from the disc record when the disc record is being rotated.

The present invention overcomes these possible problems and difficulties of the referenced enclosure design by eliminating the side wall deformation problems, matching the thermal expansion of the enclosure more closely to that of the reference plate, eliminating the need for sight windows, and by simplifying the means for drawing the enclosure side walls away from the rotating disc record.

In accordance with the principles of the present invention, an enclosure for a disc record comprises a first annular frame member having an inner surface defining the periphery of a cavity for the disc record. The enclosure also includes a second annular frame member positioned coaxial and generally coplanar with the first annular member, with the second annular member adjacent a first surface of the disc record. The enclosure further includes a first membrane cover affixed to the first annular frame member and to the second annular member and maintained in tension therebetween, the first membrane cover defining one generally planar surface of the disc record cavity.

Other features and advantages of the present invention will be more fully understood from the following detailed description of the preferred embodiment, the appended claims, and the accompanying drawings, in which:

FIG. 2 is a cross-sectional side view of a portion of the protective cartridge and disc record taken across section lines 2—2 of FIG. 1; and FIG. 3 is a cross-sectional side view of the protective cartridge and disc record apparatus of FIG. 1 showing the dust seal drawn away from the disc record during an operational mode.

Figure 1:
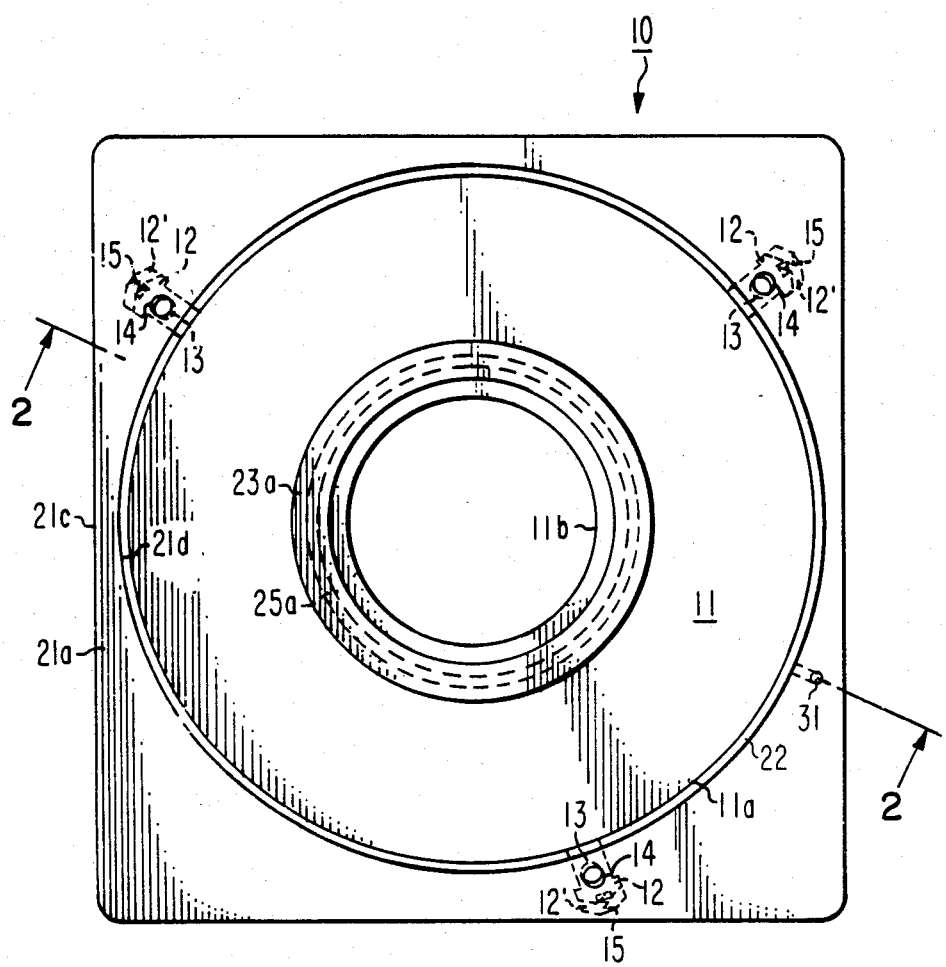
FIG. 1 is a plan view of a protective cartridge with the top surface removed having a disc record enclosed therein.

FIG. 1 is a plan view of a protective cartridge 10 suitable for use with a disc record 11. The top surface is removed for illustrative purposes. Cartridge 10 provides dust and debris protection for the information bearing surfaces of the optical disc record 11. The disc record 11 may be used in an optical record/playback system of a type described in U.S. Pat. No. 4,449,212 issued to C. W. Reno on May 15, 1984, entitled "MULTI-BEAM OPTICAL RECORD AND PLAYBACK APPARATUS", and assigned to the same assignee as the present invention. In accordance with the Reno system a light beam from a high power laser is split into a plurality of beams and focused onto the information surface of a disc record. In most optical systems, recording is achieved when the intensity of the focused light beam is of sufficient magnitude to effect ablation of the recording layer on the surface of the disc record. Illustratively, the disc record in this system may be of a type described in U.S. Pat. No. 4,222,071, entitled "INFORMATION RECORD" issued on Sept. 9, 1980, to A. E. Bell. In accordance with an ablation recording technique the material of the recording layer is elevated to an ablation temperature. The material vaporizes or melts forming a pit in the recording layer of the disc record. With suitable modulation of the intensity of the light beam in accordance with the recording signal, as successive regions of the disc record pass through the light beam path, an information track may be formed comprising pits in regions where the material is ablated separated by undisturbed regions of the recording layer (that were not subject to exposure by the high intensity beam).

In the playback mode the intensity of the light source is set at a constant level, which is below the recording level. The light beam follows the previously described information track on the disc record surface. The intensity of the light falling upon a photodetector alternates between a minumum level and a maximum level as the successive regions of the information track pass through the path of the focused beam. The output of the photodetector comprises a signal that varies in consonance with the pit edge spacing variations passing through the focused beam path. The output of the photodetector may be applied to suitable signal processing circuitry for recovering the information recorded on the disc record surface.

Referring to FIGS. 1 and 2 of the present invention, the protective cartridge 10 comprises a first generally annular frame member 21 about a cavity 22 for housing disc record 11, second and third annular frame members 23a and 23b of smaller diameter than the first annular member 21, and membrane walls 24a and 24b affixed to first annular frame member 21 and to annular frame members 23a and 23b, and held in tension between them. Frame member 21 has a generally square outer peripheral surface 21c and a circular inner peripheral surface 21d. The circular inner surface 21d forms the boundary of the cavity 22.

FIG. 1 depicts in dashed lines disc record holding means 12 of the type disclosed in the referenced Siryj et al. application. Three such holding means 12 spaced approximately 120° apart about the periphery of the disc record 11 hold the disc record. These holding means 12 are positioned in the frame 21 about the cavity 22 and are not shown in FIG. 2. Holding means 12 includes aperture 13 which is slightly offset from a corresponding aperture 14 through cartridge 10. Aperture 14 comprises aligned apertures in the upper and lower frame halves of the cartridge 10. Holding means 12 is biased by spring 15 to engage the outer rim 11a of disc record 11. When a tapered-end pin (not shown) is inserted through aperture 14 and aperture 13, holding means 12 is moved to position 12' away from disc record 11, such that apertures 13 and 14 are aligned, and holding means 12 is disengaged from the outer rim 11a of disc record 11.

Referring to FIG. 2, annular frame members 23a and 23b are mounted coaxial and generally coplanar with the first frame member 21. The members 23a and 23b are aligned and, as shown, are on opposite sides of disc record 11. Annular members 23a and 23b include dust seals 25a and 25b, respectively, which are held against disc record 11 by the tension in membrane walls 24a and 24b, respectively. This view also illustrates frame member 21 as comprising upper half 21a and lower half 21b, configured thus for ease of assembly of cartridge 10. Upper frame half 21a is shown as including aperture 31 which provides a passageway for air between cavity 22 and the exterior surface 21c of frame 21 of cartridge 10. Check valve 32, which may suitably comprise a flap valve, covers aperture 31 and normally assumes a closed position. In the presence of higher air pressure outside cavity 22 than inside, check valve 32 opens to admit a flow of air.

Frame member halves 21a and 21b are suitably made of a metal casting, typically aluminum or zinc. Annular members 23a and 23b are also suitably made of the same type of metal. Membrane walls 24a and 24b comprise thin soft pliable sheets which may be polymides or polyesters, and may, for example, be selected from among Mylar, Kapton, Tedlar and Teflon. They may typically be between 3 and 12 mils (0.08 and 0.30 mm) thick, and are preferably between 5 and 7 mils (0.13 and 0.18 mm) in thickness. It may be noted that all of the above candidate membrane materials are available as clear films. The use of a clear film as membrane walls 24a and 24b permits optical transmissions therethrough without the need for a special sight window. Membrane walls 24a and 24b are typically attached to frame halves 21a and 21b and to annular members 23a and 23b, respectively, by a thermal activated adhesive such as, for example, a nitril rubber-based adhesive such as Scotchgrip 2126, sold by The Minnesota Mining & Mfg. Co., St. Paul, Minn. Dust seals 25a and 25b, suitably affixed in notches 26a and 26b of annular members 23a and 23b, respectively, may typically comprise nylon filaments formed into continuous rings.

The cross-sectional view of the present invention shown in FIG. 2 depicts annular members 23a and 23b urging dust seals 25a and 25b against disc record 11 to prevent the introduction of dust or other foreign particles into cavity 22. However, when disc record 11 rotates, dust seals 25a and 25b must break contact with disc record 11 so as not to impede its motion or abrade its surface.

FIG. 3 illustrates apparatus for lifting dust seals 25a and 25b from the surfaces of disc record 11. Air pump 40, or any suitable source of pressurized air, is coupled via valve 41 to aperture 31. When valve 41 opens so as to pass air through aperture 31, check valve 32 opens to admit air into cavity 22, as shown in the figure. The increase in air pressure within cavity 22 causes membrane walls 24a and 24b to billow, thereby lifting annular members 23a and 23b (and hence, dust seals 25a and 25b) away from the surfaces of disc record 11. Disc record 11 is now free to rotate, via a driving means (not shown) which engages the inner rim 11b of disc record 11, unimpeded by dust seals 25a and 25b. Once disc record 11 has achieved its normal rotational speed, typically 1800 rev/minute, the windage it creates by its centrifugal force will tend to maintain high pressure air within cavity 22. Thus, once rotational speed has been reached, valve 41 may be closed and the gap between dust seals 25a and 25b and disc record 11 will be maintained.

It was noted in an earlier paragraph that frame member 21 comprises upper and lower halves 21a and 21b.

and that membrane walls 24a and 24b are affixed, respectively, to annular members 23a and 23b and frame halves 21a and 21b by a thermal activated adhesive. This configuration permits the fabrication of the halves of protective cartridge 10 without the presence of disc record 11. With adhesive applied to suitable surfaces of annular members 23a and 23b and frame member halves 21a and 21b, and with membrane walls 24a and 24b placed in their corresponding positions such that annular members 23a and 23b are generally concentric with the central apertures of frame halves 21a and 21b, respectively, the assemblies thus made are subjected to heat. The heat serves two functions: it cures the adhesive and, as the assembly cools from the curing process, the plastic film membrane walls 24a and 24b will contract at a faster rate than the metallic members 21a, 21b, 23a and 23b.

The membrane walls 24a and 24b are thus tensioned between the frame member halves 21a and 21b and the annular members 23a and 23b at normal room temperatures, and the latter members are thus maintained in the same plane as the former. The amount of tension on membrane walls 24a and 24b will depend on the adhesive-curing temperature and on the specific membrane material chosen. The tension should be sufficient to maintain membrane walls 24a and 24b wrinkle-free during all phases of record and playback operation, but well below the ultimate stress level for the particular type of plastic film.

The entire record package is completed by a suitable adhesion of frame member half 21a to frame member half 21b with record disc 11 in place within cavity 22. This adhesion may be made, for example, by use of a cyano acrylate adhesive. Alternatively, since the cartridge may be reusable even after the disc record is no longer useful, fastening devices such as nuts and bolts may be used to hold frame member halves 21a and 21b together.

It was earlier noted that membrane walls 24a and 24b may be fabricated of a clear material. This not only obviates the need for a separate optical window, but it also permits the use of multiple record/playback heads at a single disc record, thereby increasing the rate of data transfer in the optical disc system.

Other embodiments of the present invention will be apparent to those skilled in the art to which it pertains. The scope of this invention is not intended to be limited to the embodiment disclosed herein but should instead be gauged by the breadth of the claims which follow.

What is claimed is:

1. An enclosure for a disc record comprising:
   a first annular frame member having an inner surface defining the periphery of a cavity for said disc record;
   a second annular frame member positioned coaxial and generally coplanar with said first annular member, with said second annular member adjacent a first surface of said disc record; and
   a first membrane cover affixed to said first member and to said second annular member and maintained in tension therebetween, said first membrane cover defining one generally planar surface of said disc record cavity.

2. The enclosure according to claim 1 further including:
   a third annular frame member, aligned with said second annular frame member and positioned coaxial and generally coplanar with said first annular frame member, said third annular frame member adjacent a surface of said disc record opposite said first surface; and
   a second membrane cover affixed to said first member and to said third annular member and maintained in tension therebetween, said second membrane cover defining a second generally planar surface of said disc record cavity.

3. The enclosure according to claim 2 wherein said second and third annular members include sealing means individually affixed to said respective second and third annular members and urged against said surfaces of said disc record by the tensions of said first and second membrane covers.

4. The enclosure according to claim 2 including means for introducing pressurized air within said disc record cavity to cause said sealing means to be lifted from said surfaces of said disc record.

5. The enclosure according to claim 4 wherein said pressurized air is introduced into said disc record cavity by a rotational force of said disc record.

6. The enclosure according to claim 3 wherein said sealing means are annular filaments fixed in corresponding grooves within said second and third annular members.

7. The enclosure according to claim 2 wherein said first and second membrane covers are plastic films.

8. The enclosure according to claim 2 wherein said first and second membrane covers are virtually transparent to light transmission.

9. The enclosure according to claim 2 wherein said first and second membrane covers are affixed to said second and third annular members, respectively, and to said first annular frame member by a thermal activated adhesive.

10. A record package for use in an optical information storage and retrieval system, said record package comprising:
    a disc record;
    a first annular frame member having an inner surface defining the periphery of a cavity for enclosing said disc record;
    a second annular frame member positioned coaxial and generally coplanar with said first annular member, with said second annular member adjacent a first surface of said disc record; and
    a first membrane cover affixed to said first member and to said second annular member and maintained in tension therebetween, said first membrane cover defining one generally planar surface of said disc record cavity.

11. The record package according to claim 10 further including:
    a third annular frame member, aligned with said second annular frame member and positioned coaxial and generally coplanar with said first annular frame member, said third annular frame member adjacent a surface of said disc record opposite said first surface; and
    a second membrane cover affixed to said first member and to said third annular member and maintained in tension therebetween, said second membrane cover defining a second generally planar surface of said disc record cavity.

12. The record package according to claim 11 wherein said second and third annular members include sealing means affixed to said respective annular members and urged against said surfaces of said disc record by the tensions of said first and second membrane covers.

13. The record package according to claim 11 including means for introducing pressurized air within said disc record cavity to cause said sealing means to be lifted from said surfaces of said disc record.

14. The record package according to claim 13 wherein said pressurized air is introduced into said disc record cavity by a rotational force of said disc record.

15. The record package according to claim 11 wherein said sealing means are annular filaments fixed in corresponding grooves within said second and third annular members.

16. The record package according to claim 11 wherein said first and second membrane covers are plastic films.

17. The record package according to claim 11 wherein said first and second membrane covers are virtually transparent to light transmission.

18. The record package according to claim 11 wherein said first and second membrane covers are affixed to said second and third annular members, respectively, and to said first annular frame member by a thermal activated adhesive.

19. A method for rotating a disc record enclosed in an enclosure including a sealing member against a side surface of said disc record comprising the steps of:
   introducing external pressure into said enclosure to cause said sealing member to lift off said disc record;
   rotating said disc record at sufficient speed to introduce enough pressure to maintain said sealing member off said disc record; and
   removing said external pressure whereby said sealing member reseals said disc record when rotation stops.

* * * * *